Nov. 17, 1970  B. UKMAR ET AL  3,541,232
TRANSMISSION DEVICE FOR A START-STOP TELEPRINTER
Filed March 20, 1968  3 Sheets-Sheet 1

INVENTORS
BORIS UKMAR
GIUSEPPE RICCIARDI
BY John Toggenburger
AGENT

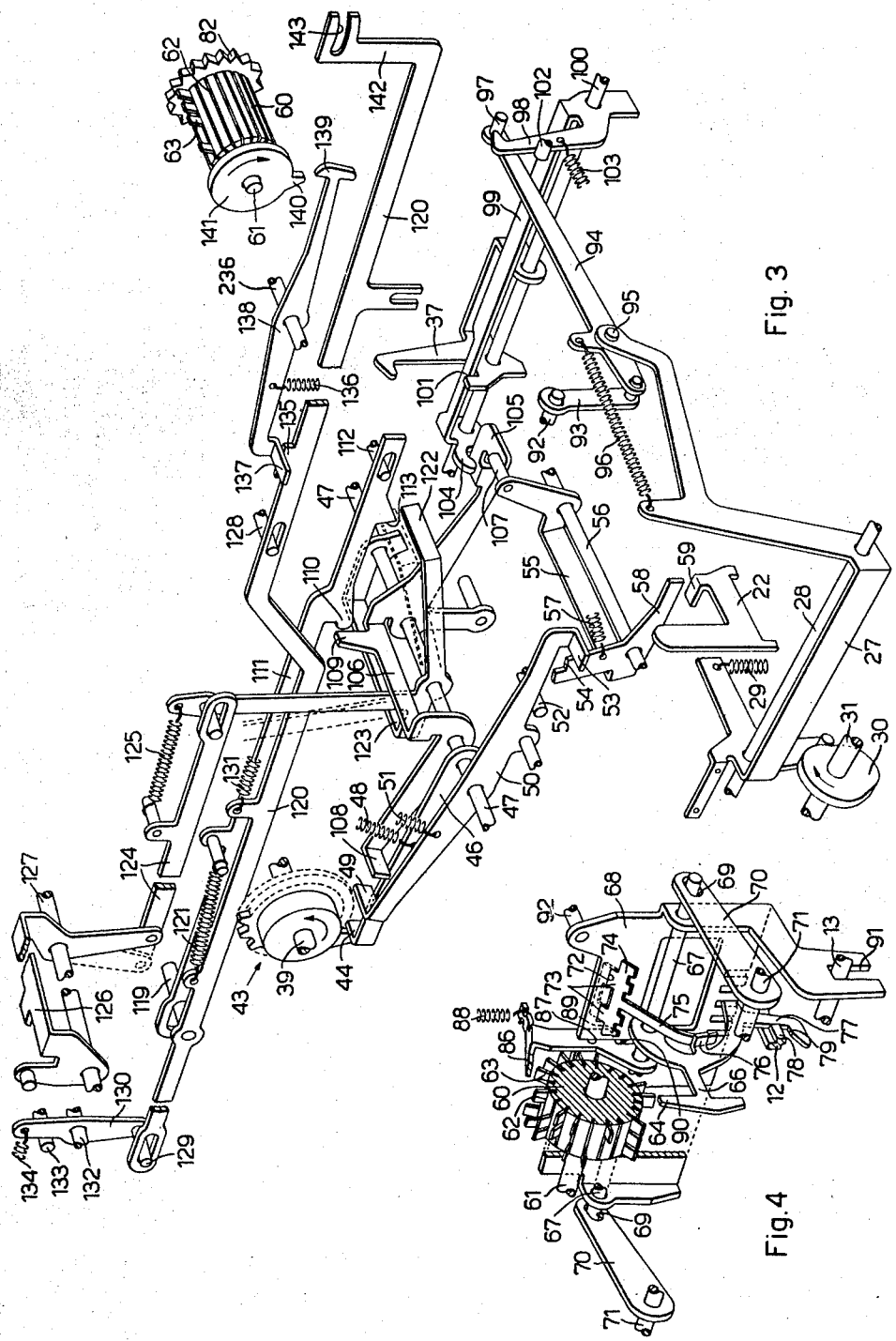

United States Patent Office

3,541,232
Patented Nov. 17, 1970

3,541,232
TRANSMISSION DEVICE FOR A START-STOP TELEPRINTER
Boris Ukmar and Giuseppe Ricciardi, Ivrea, Italy, assignors to Ing. C. Olivetti & C., S.p.A., Ivrea, Italy, a corporation of Italy
Filed Mar. 20, 1968, Ser. No. 714,488
Claims priority, application Italy, Mar. 24, 1967, 803,664
Int. Cl. H04l 15/18
U.S. Cl. 178—17
12 Claims

ABSTRACT OF THE DISCLOSURE

A transmission device for a start-stop teleprinter wherein a set of transmission bars are set up under the control of a set of transfer levers to control a cyclically operable parallel-to-series converter, and an answer back drum is simultaneously sensed by a set of sensing members, the levers are cross-shaped and comprise each one a pair of opposite arms engageable by a pair of shoulders of a corresponding code member, and a third arm connected to a corresponding one of said transmission bars, each transfer lever moreover comprising a pair of elements engageable selectively by a pair of counterelements of one of said sensing members. The transmission device is also provided with a tape reader having a set of code elements rigidly connected to the transmission bars and comprises various interlocking means for preventing the tape reading and the answer back sensing as long as the teleprinter is transmitting code combinations from the code member.

BACKGROUND OF THE INVENTION

The present invention relates to a transmission device for a start-stop teleprinter comprising a set of transfer levers which are adapted to be set up simultaneously in one of a pair of positions for transferring the code combination of a message to be transmitted to a set of transmission bars adapted to control a cyclically operable parallel-to-series converter, and a set of sensing members adapted to simultaneously sense a mechanical memory of a predetermined message.

In a known teleprinter a set of sensing members is adapted to sense alternately the transfer members and a memory drum, for example the conventional answer back drum. This teleprinter, however, requires the transfer members to be specifically predisposed for sensing the drum, and the drum to be specifically conditioned in the inoperative condition to permit the sensing operation of said members.

In another known teleprinter, the keyboard and the answer back drum are electrically connected to a parallel-to-series converter comprising a set of annular sectors and adapted to be sensed by a rotating brush. This teleprinter, however, requires an interlocking device to prevent mutual interferences between the signals given by the keyboard and by the drum.

SUMMARY OF THE INVENTION

All these disadvantages are obviated by the transmission device according to the invention which is characterized in that said levers are substantially cross-shaped each one of said levers comprising a pair of opposite arms engageable selectively by a pair of shoulders provided on a corresponding code member so as to be positively displaced to each one of said pair of positions, and a third arm connected to a corresponding one of said transmission bars, each transfer lever moreover comprising a pair of elements adapted to be engaged selectively by a pair of counterelements carried by a corresponding one of said sensing members.

A preferred embodiment of the invention will now be described by way of example with reference to the accompanying drawings:

BRIEF DESCRIPTION OF THE DRAWINGS

FIG. 3 is another front perspective view from the left of the teleprinter;

FIG. 4 is a partial rear perspective view from the left of a detail of the teleprinter;

DESCRIPTION OF THE PREFERRED EMBODIMENTS OF THE INVENTION

The teleprinter is of the start-stop type and comprises five transverse code bars 4 (FIG. 1) each one adapted to oscillate about two pivots 5 secured to the two ends of each bar 4 and rotatable in the machine frame. The bars 4 are adapted to be set up selectively by a plurality of longitudinal slides 6, only one of which is visible in FIG. 1.

Figures 1, 2:
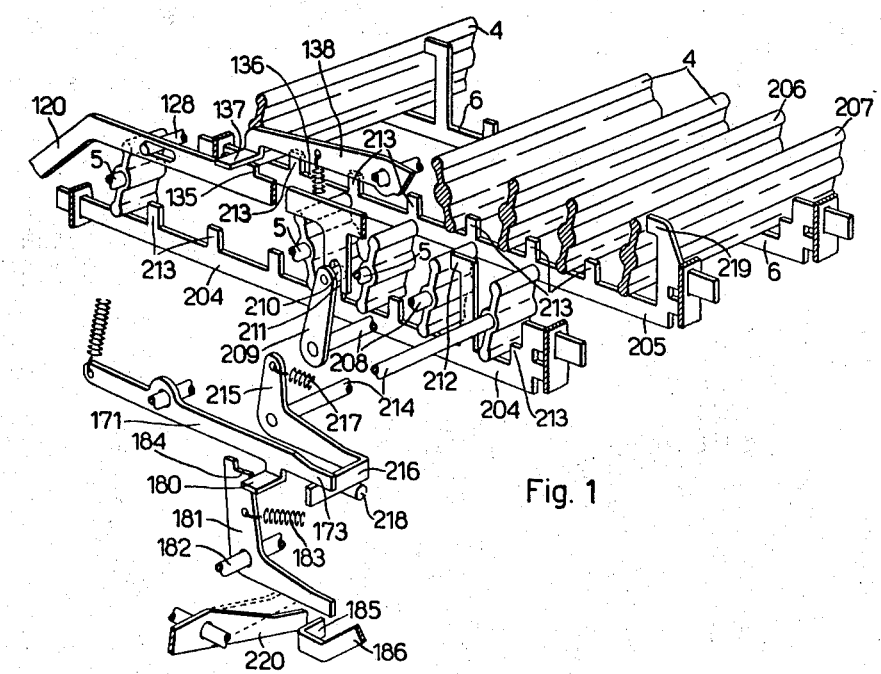
FIG. 1 is a partial front perspective view from the left of a start-stop teleprinter incorporating a transmission device according to the invention.
FIG. 2 is another partial front perspective view from the left of the teleprinter of FIG. 1.

The slides 6 are adapted to be shifted to the left in FIG. 1 upon depressing a corresponding key (not shown in the drawings) in the manner described in the U.S. Pat. No. 3,306,417. FIG. 1 shows the slides 6 associated with the key of the letter A according to the five-unit code of the CCITT (International Telephone and Telegraph Consultative Committee).

The teleprinter is moreover provided with a transmission device having a series of transmission bars 8 (FIG. 2) adapted to assume selectively one or the other of two longitudinal positions on a pair of spindles 9 fixed to the machine frame. The bars 8 are each one provided with a projection 10 engaged in a corresponding wedge shaped slide 11. The slides 11 are adapted to be sensed sequentially by a parallel-to-series converter of the type described in the U.S. patent application, Ser. No. 638,180, dated Apr. 25, 1967, now Pat. No. 3,465,100.

The transmission device moreover comprises five cross shaped transfer members or levers 12, adapted to be set up simultaneously, only one lever 12 being shown in FIG. 2. Each lever 12 is pivoted on a stationary shaft 13 and is provided with an arm 14 engaging a notch in a corresponding transmission bar 8. Each lever 12 moreover has two opposite arms 15 and 16 adapted to cooperate alternately with two shoulders 17 and 18 of a corresponding code slide 19. The slides 19 are slidable in two fixed combs 20 and 21 and are positioned selectively under the control of the code bars 4 through an intermediate storage device in the manner described in the U.S. patent application, Ser. No. 647,648, dated June 21, 1967, now Pat. No. 3,450,835.

The five slides 19 are embraced by an actuator formed of a frame 22 slidable vertically in two slots 23 provided on a stationary plate 24. The frame 22 is connected to a lever 25 fulcrumed on a pivot 26 secured to a bail 27. The latter is fulcrumed on a stationary spindle 28 and is normally urged by a spring 29 to bear against a cam 30 secured to a longitudinal shaft 31 cyclically rotatable in a clockwise direction and forming the conventional transmission shaft of the teleprinter. The lever 25 is connected by means of a spring 32 to a lug 33 of the bail 27 and carries a stud 36 normally latched by a latch 37 fulcrumed on a stationary spindle 38.

As described in the aforesaid patent application, Ser. No. 647,648, the shaft 31 is rotated cyclically simultaneously with a transverse shaft 39 (FIG. 3), which is rotated one revolution counterclockwise through a clutch 43 engageable to cause a transmitting cycle of the machine. The clutch 43 is normally held disengaged by a lug 44 of a lever 46 fulcrumed on a stationary spindle 47. The lever 46 is normally urged by a spring 48 to bear against a lug 49 of a lever 50 also fulcrumed on the spindle 47. The lever 50, in turn, is normally urged by a spring 51 to bear against a pin 52 adapted to be moved upwards immediately after the slides 19 (FIG. 2) have been set up according the code combination. The lever 50 (FIG. 3) has a lug 53 adapted to cooperate with a shoulder 54 of a bail 55 fulcrumed on a stationary spindle 56 and normally bearing against the lug 53 under the action of a spring 57. The bail 55 is provided with an arm 58 adapted to cooperate with a lug 59 of the frame 22.

When the pin 52 (FIG. 3) is moved upwards, the lever 50 is rocked in an anticlockwise direction and is latched in the rocked position by the shoulder 54 of the bail 55. Furthermore, the lever 50 by means of the lug 49 rocks the lever 46 counterclockwise thereby engaging the clutch 43, which now rotates the shaft 39 counterclockwise and the shaft 31 clockwise one revolution.

During the transmitting cycle of the shaft 31, the cam 30 rocks the bail 27 counterclockwise. The pivot 26 (FIG. 2) of the bail 27 then causes the lever 25 to turn about the stud 36, thus displacing the frame 22 and, therefore, also the five slides 19 upwards. One of the two shoulders 17 and 18 of each slide 19 engages the corresponding arm 15 and 16, thus rocking the lever 12 in one direction or the other, and setting up the corresponding transmission bar 8 together with the slide 11.

Simultaneously, the lug 59 (FIG. 3) of the frame 22 engages the arm 58 of the bail 55, which is thus rocked counterclockwise. The shoulder 54 of the bail 55 then releases the lug 53 of the lever 50, which is returned to rest by the spring 51, while the lever 46 is returned to rest by the spring 48, thus predisposing the disengagement of the clutch 43. The five slides 11 (FIG. 2) are then serially sensed to send to the line the signals corresponding to the code combination set therein.

The teleprinter is moreover equipped with a mechanical memory of a predetermined message, constituted by a conventional automatic answer back drum 60 (FIG. 4). This latter is rotatable on a stationary shaft 61 and is provided with twenty equally angularly spaced slots 62 each one housing the code strip 63 having a set of teeth and spaces corresponding to the code combination of a character of the automatic answer back.

Figure 5:
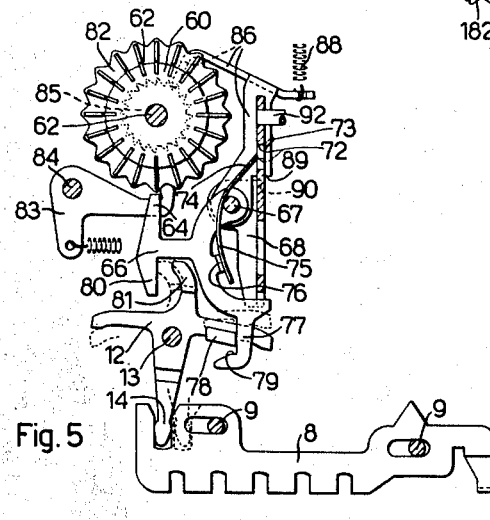
FIG. 5 is a longitudinal section of a detail of the teleprinter.

The strips 63 are adapted to be sensed by a projection 64 of a set of sensing members 66 fulcrumed on a bar 67 carried by a frame 68. The bar 67 is engaged in slots 69 in a pair or arms 70 fixed on a shaft 71 rotatable in the machine frame. The frame 68 is provided with a U-shaped slot 72 which is engaged by a pair of projections 73 of a resilient comb 74 forming a set of leaf springs 75. Each spring 75 acts on a lug 76 of the corresponding sensing member 66 to cause an arm 77 of the member 66 to bear against a projection 78 extending laterally from the corresponding cross-shaped lever 12 (FIG. 5). Each member 66 is moreover provided with a step 79 adapted to cooperate with the projection 78. A projection 80 of each member 66 is also adapted to cooperate with an arm 81 bent laterally from the corrsponding cross-shaped lever 12.

The drum 60 is fast with a toothed wheel 82 having a pitch equal to that of the slots 62 and normally held in the reached position by a spring-loaded positioning member 83 pivoted on a stationary spindle 84. Secured to the drum 60 is also a ratchet wheel 85 cooperating with a pawl 86 engaged in a slot 87 (FIG. 4) of the frame 68. The pawl 86 is normally held in engagement with the wheel 85 by a spring 88 and is provided with a shoulder 89 adapted to cooperate with an edge 90 of the slot 87.

A lower projection of the frame 68 is provided with a notch 91 slidable vertically on the shaft 13 and is moreover provided with a pin 92 connected by means of a link 93 (FIG. 3) to a lever 94. The latter, in turn, is pivoted on a pivot 95 secured to the bail 27. The lever 94 is connected by means of a spring 96 to the bail 27 and carries a stud 97 adapted to cooperate with a latch arm 98 of a bail 99 slidable and rotatable on a stationary spindle 100. The bail 99 engages a notch 101 of the latch 37 and is normally urged by a spring 103 to bear against a fixed stop 102. The bail 99 is provided with a forked arm 104 engaging a lug 105 of a bail 106 fulcrumed on the spindle 47. The lug 105 is adapted to cooperate with a pin 107 of the bail 55.

The bail 106 is provided with a bent lug 108 adapted to cooperate with the lever 46. The bail 106 is moreover provided with a toth 109 cooperating with a projection 110 of a slide 111 slidable on a stationary pin 112 and on a pin 119 secured to a slide 120. The slide 111 is normally urged by a spring 121 stretched between the slide 111 and the slide 120 to bear against the pin 119. The slide 111 is moreover provided with a shoulder 113 cooperating with a lug 122 of another bail 123. The latter is fulcrumed on the spindle 47 and is pin and slot connected with a link 124, to which it is moreover connected by means of a spring 125. The link 124 is linked with a bail 126 fulcrumed on a stationary shaft 127. The bail 126 is located in the position shown by solid lines in FIG. 3 when the teleprinter is in the inoperative or receiving state and the position shown by broken lines when the teleprinter is in the transmitting state, in a manner known per se.

The slide 120 is slidable on a stationary pin 128 and on a pin 129 of a lever 130, the slide 120 being normally urged by a spring 131 to bear against the pin 129. The lever 130 is fulcrumed on a stationary pin 132 and is normally urged by a spring 134 to bear against a fixed stop 133. The lever 130 is adapted to be rotated in a clockwise direction on receipt of a "WHO ARE YOU" code combination transmitted by a distant telegraph station, in a manner known per se.

Figure 6:
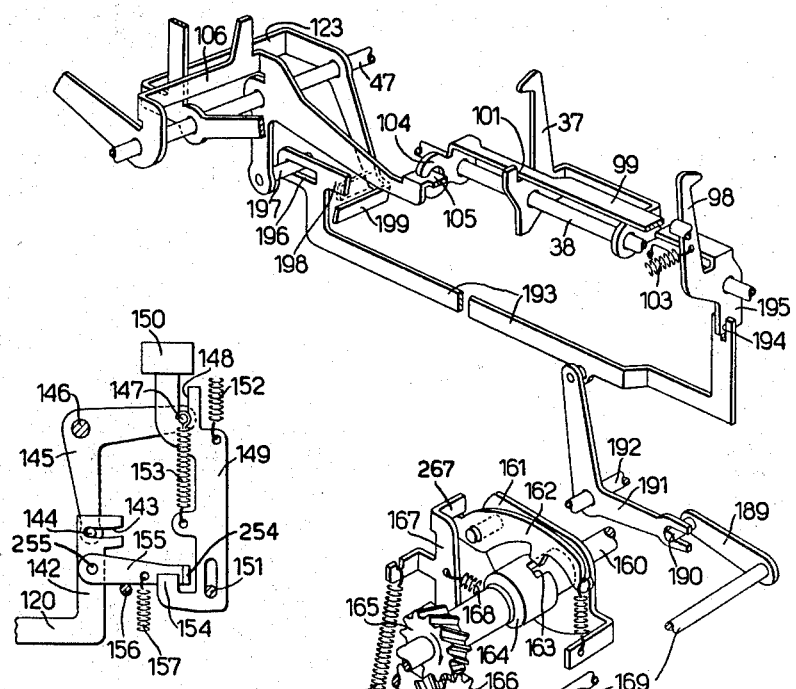
FIG. 6 is a side view of a detail of the teleprinter.

The slide 120 is provided with a tooth 135 normally contacted by a lug 137 of a detent lever 138 fulcrumed on a stationary spindle 236 and urged counterclockwise. The lever 138 is provided with a projection 139 adapted to cooperate with a tooth 140 of a disc 141 secured to the drum 60. The forward end of the slide 120 is moreover provided with an extension 142 having a slot 143 engaged by a stud 144 (FIG. 6) of a bell crank 145 fulcrumed on a stationary pivot 146. The bell crank 145 is provided with a second stud 147 engaging a slot 148 of a stem 149 of the conventional "HERE IS" key 150. The stem 149 is slidable vertically on a stationary pin 151 and is urged by a spring 152 to contact this pin. The stem 149 is moreover connected to the bell crank 145 by means of a spring 153 stronger than the spring 131 (FIG. 3). The stem 149 (FIG. 6) is provided with a projection 154 adapted to cooperate with a lug 254 of a lever 155 pivoted at 255 on the extension 142 of the slide 120 and is normally urged by a spring 157 to bear against a fixed stop 156.

To initiate the automatic transmission of the answer back, the "HERE IS" key 150 is fully depressed. At the beginning of the downward stroke of the key 150, the spring 153 rocks the bell crank 145 clockwise, and shifts the slide 120 to the rear until the lug 254 is arrested by the projection 154. As the depression of the key 150 is continued, the projection 154 slides in contact with the lug 254, till the projection 154 is brought below the lug 254. The spring 153 causes now the bell crank 145 to jump clockwise and shifts the slide 120 (FIG. 3) to the end of its stroke, so as to disengage the tooth 135 from the lug 137, which thus locks the slide 120 in the reached position, while the lug 254 (FIG. 6) remains above the projection 154.

If the key 150 is now released, the stem 149 is returned to the inoperative position together with the bell crank 145 by the spring 152, while the slide 120 remains locked in the shifted position by the lug 137 (FIG. 3). On the contrary, should the key 150 have been released without having been fully depressed, that is to say if the projection 154 has not freed the lug 254, the slide 120 cannot be locked by the lug 137 and the operation has no effect.

Assuming that the teleprinter is initially in the inoperative or receiving state, the link 124 and the bail 123 are in the position shown by solid lines in FIG. 3, whereby the shoulder 113 of the slide 111 is not impeded by the lug 122. The slide 111 is therefore shifted rearwards by the spring 121. In turn, the projection 110 engages the tooth 109, thus rocking the bail 106 counterclockwise. The bail 106 then, by means of the lug 108, on the one hand rocks the lever 46 counterclockwise thus causing the clutch 43 to be engaged and, on the other hand, by means of the lug 105 rocks the latch 37 and the bail 99 clockwise.

The latch arm 98 now engages the stud 97, while on the other hand the latch 37 releases the stud 36 (FIG. 2), thus preventing, throughout the duration of the transmission of the answer back, the transfer to the transmission bars 8 of any possible code combination set through the keyboard on the slides 19. Since, however, the lug 105 (FIG. 3) has rocked also the bail 55 counterclockwise, if the lever 50 were also to be rotated counterclockwise by the pin 52, it would not remain engaged by the shoulder 54 of the bail 55 and therefore does not effect the clutch 43. The lever 46 is now held in the rocked position by the lug 137 of the lever 138 through the slides 120 and 111 and the bail 106.

The clutch 43 now initiates a clockwise revolution of the shaft 31. The cam 30 then rocks the bail 27 counterclockwise, so that the pin 95 causes the lever 94 to rock about the stud 97. By means of the link 93 and the pin 92, the lever 94 now moves the frame 68 (FIGS. 4 and 5) upward together with the five sensing members 66 and the pawl 86, which engages the following tooth of the wheel 85. If the projection 64 of a sensing member 66 encounters a tooth of the strip 63 to be read, the projection 80 of the member 66 engages the arm 81, carrying the lever 12 into the position shown in FIG. 5, if it is not already in it. If, on the other hand, the projection 64 encounters a space, the step 79 engages the projection 78 and rocks the lever 12 counterclockwise to the position shown in dash lines in FIG. 5. The transmission bars 8 and the slide 11 are thus selectively positioned according to the code combination of the character of the answer back.

The cam 30 (FIG. 3) thereafter allows the bail 27 to return clockwise, thereby bringing the lever 94 back to its inoperative position and thus lowering the frame 68 (FIG. 5). The pawl 86, in turn, is lowered by the bar 67 and engages the wheel 85 to advance the drum 60 one step clockwise. The five slides 11 (FIG. 2) are now sensed to send to line the signals corresponding to the code combination read, as in the preceding case. Simultaneously, a new cycle of the shaft 31 is initiated for reading the following strip 63 (FIG. 3) of the drum 60.

When the drum 60 has passed through a complete revolution, the tooth 140 of the disc 141 rocks the lever 138 clockwise, thus disengaging the lug 137 from the tooth 135 of the slide 120. This slide is then returned forward by the spring 131, together with the slide 111, which releases the tooth 109 of the bail 106. The latter is now returned to the inoperative position together with the latch 37 and the bail 99 by the spring 103, while the bail 55 and the lever 46 are returned to their inoperative positions by their respective springs 57 and 48. The clutch 43 is then disengaged and the shaft 31 stops.

Assuming now that the "HERE IS" key 150 (FIG. 6), is depressed while the teleprinter is transmitting. The bail 126 is now located in the position shown by broken lines in FIG. 3 and by means of the link 124 holds the bail 123 turned counterclockwise. The lug 122 is then behind the shoulder 113 and prevents movement of the slide 111 to the rear, as a result of which the spring 121 is tensioned, the bail 106 is not rocked and the drum 60 is not sensed. Since the slide 120 has also been moved rearwards, it is locked in the reached position by the lug 137 of the lever 138. At the end of the transmission, the link 124 returns to the position of FIG. 3 and the lug 122 releases the shoulder 113. The slide 111 is now moved to the rear by the spring 121, causing the transmission of the answer back, as hereinbefore described.

The drum 60 can also be read on receipt of a "WHO ARE YOU" code combination. In this case, the lever 130 is rotated clockwise in a known manner and displaces the slide 120 to the rear as in the case of the depression of the key 150.

Figure 7:
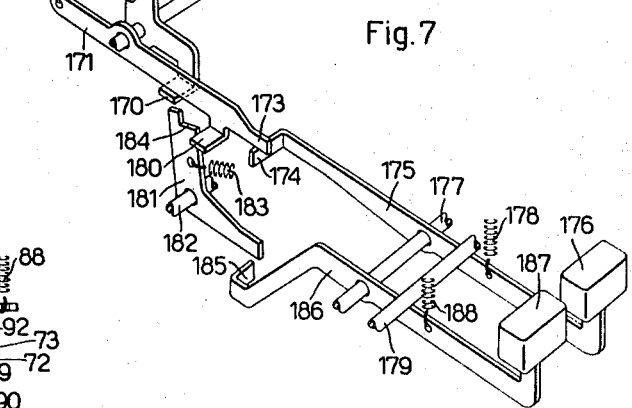
FIG. 7 is another partial front perspective view from the left of the teleprinter.

The teleprinter moreover incorporates an automatic transmitter comprising a conventional tape reader. More particularly, the tape reader comprises a main shaft 160 (FIG. 7) secured to a disc 161 constituting the driven portion of a one revolution clutch. Pivoted on the disc 161 is a latch 162 adapted to engage a notch 163 of a sleeve 164 forming the driving portion of the clutch. Pivoted on the disc 161 is a latch 162 adapted to engage a notch 163 of a sleeve 164 forming the driving portion of the clutch. Secured to a sleeve 164 is a helical pinion 165 in mesh with another helical pinion 166 secured to the transmitting shaft 31 of the teleprinter. The latch 162 is normally held disengaged by a lug 267 of a lever 167 which is kept turned in the position shown in FIG. 7 by a spring 168.

The lever 167 is secured to a shaft 169 rotatable on the machine frame, and it is provided with a lug 170 normally contacted by a lever 171 pivotally mounted on the shaft 169 under the urge of a spring 172. The lever 171 has a projection 173 adapted to cooperate with a lug 174 of a lever 175 carrying a starting key 176 depressible to start the tape reader. The lever 175 is fulcrumed on a stationary shaft 177 and is normally urged by a spring 178 to bear against a stationary stop 179.

The lever 171 is moreover provided with a lug 180 adapted to cooperate with a hook 181 fulcrumed at 182. The latch 181 is normally urged by a spring 183 to bear against the lug 180 and is provided with a shoulder 184 adapted to cooperate with the lug 180. The latch 181 is moreover adapted to cooperate with a lug 185 of a lever 186 carrying a stop key 187 depressible to stop the tape reader. The lever 186 is fulcrumed on the shaft 177 and is normally urged by a spring 188 to bear against the stop 179.

Secured to the shaft 169 is also a crank 189 having a pin 190 engaging a notch in a lever 191 fulcrumed on a stationary pivot 192. The lever 191 is linked with a slide 193 having a notch 194 engaging a projection 195 of the bail 99. The slide 193 is connected by means of a slot 196 to a pin 197 of the bail 106 and is provided with a projection 198 adapated to cooperate with a second lug 199 of the bail 123. The lug 199, however, is normally below the path of the projection 198.

The tape reader moreover comprises a series of five code bars 200 (FIG. 2) adapted to be positioned selectively according to the code combination read in the tape and correspond substantially to the bars indicated by the numeral 72 in the U.S. patent application Ser. No. 667,792 dated Sept. 14, 1967, now U.S. Pat. No. 3,476,300. Each bar 200 is connected to a corresponding arm 201 secured to a shaft 202 rotatable in the machine frame. Secured to each shaft 202 is a second arm 203 connected to the corresponding transmission bar 8 of the teleprinter.

On depression of the starting key 176 (FIG. 7), the lever 175 rocks the lever 171 counterclockwise and is latched in the rocked position by the latch 181. In turn the spring 172 tends to rock the lever 167 in the same direction, the spring 172 being stronger than the spring 168 whereby through the shaft 169 and the crank 189, tends to rock the lever 191 clockwise and therefore to move the slide 193 forward.

Assuming that the teleprinter is initially in the inoperative or receiving state, the link 124 (FIG. 3) and the bail 123 are in the position shown in FIG. 3, so that the slide 193 is not arrested by the lug 199 and is able to move forward its full stroke. The slide 193 then on the one hand rocks the bail 106 counterclockwise and causes the clutch 43 (FIG. 3) to be engaged, as seen hereinbefore, on the other hand it displaces the bail 99 axially forwards, the latch arm 98 of the bail 99 being thus brought forward with respect to the pin 97 (FIG. 3). Moreover, the bail 106 rocks now the bail 99 clockwise together with the latch 37, which thus releases the stud 36 (FIG. 2). In this way, both the transfer to the transmission bars 8 of the code combinations possibly read on the drum 60 (FIG. 3) and that of any possible code combinations set up on the slides 19 (FIG. 2) is prevented throughout the duration of the transmission of the code combinations read in the perforated tape.

During each cycle of the transmitting shaft 31 one revolution of the main shaft 160 (FIG. 7) of the reader is also effected. The bars 200 (FIG. 2) are then positioned selectively according to the code combination read in the punched tape and by means of the arms 201, the shafts 202 and the arms 203 position the corresponding transmission bars 8 and the slides 11. As hereinbefore stated, the position of the slide 11 is sensed during each cycle of the shaft 31 to send over the telegraph line the signals corresponding to the sensed code combination.

When the stop key 187 is depressed (FIG. 7), the lever 186 through the lug 185 rocks the latch 181 counterclockwise. The latch 181 then releases the lever 171 and causes the spring 168 to rock the lever 167 clockwise together with the lever 171. At the end of the reading cycle, the lever 167 disengages the latch 162 from the sleeve 164, as a result of which the shaft 160 is arrested. Moreover, by means of the shaft 169, the crank 189 and the lever 191, the lever 167 returns the slide 193 to the rear, returning the bail 106 to the inoperative position together with the latch 37 and the bail 99. In turn, the bail 106 causes the clutch 43 to be disengaged thus stopping the rotation of the transmitting shaft 31.

Assuming now that the starting key 176 is depressed while the teleprinter is in the transmitting state, since the bail 126 is in the position shown by broken lines in FIG. 3 and the bail 123 is rocked counterclockwise, the lug 199 (FIG. 7) prevents the slide 193 from being moved forward. The lever 167 then remains in the position shown in FIG. 7, thus preventing the shaft 160 from being started and stretching the spring 172, while the lever 171 remains locked in the rocked position by the latch 181. As soon as the transmission is ended, the lug 199 returns to the position shown in FIG. 7 and the spring 172 can finally turn the lever 167 as in the preceding case.

The code combinations emanating from the slides 19 (FIG. 2), the drum 60 (FIG. 3) and the reader follow for transmission the order of priority in which they are set up by the operator. To this end, the teleprinter comprises in addition to the "HERE IS" key 150 (FIG. 6), or as an alternative thereto, another "HERE IS" key not shown in the drawings, which is adapted to move to the rear a setting slide 204 (FIG. 1) similar to the slides 6 of the printing keys. The teleprinter moreover comprises, in addition to the starting key 176 (FIG. 7) for the reader, or as an alternative thereto, a reader starting key not shown in the drawings, which is adapted to move to the rear another setting slide 205 (FIG. 1).

Located adjacent to the code bars 4 (FIG. 1) are also two more bars 206 and 207 similar to the code bars 4. Secured to a pivot 208 of the bar 206 is a crank 209 having a pin 210 engaging a notch 211 in the slide 120. The bar 206 is normally held rocked clockwise by the spring 131 (FIG. 3) and is adapted to be engaged at the top by a projection 212 (FIG. 1) of the slide 204. This latter is moreover provided with a series of six projections 213 adapted to act at the bottom on the bars 4 and on the bar 207.

Secured to a pivot 214 of the bar 207 is a crank 215 provided with a lug 216 normally urged by a spring 217 to bear against a fixed stop 218. The lug 216 is moreover adapted to cooperate with the projection 173 of the lever 171 in a manner similar to the lug 174 (FIG. 7) of the lever 175. The bar 207 (FIG. 1) is adapted to be engaged at the top by a projection 219 of the slide 205. The latter is moreover provided with a series of six projections 213 in correspondence with the bars 4 and the bar 206. Finally, a lever 220 indicating the presence of the tape in the reader can cooperate with the latch 181 and is arranged to rotate from the position shown by continuous lines in FIG. 1 to the position shown by dash lines therein in the absence of any tape and, therefore, when a tape to be transmitted terminates.

When the slide 204 is moved to the rear, the bars 4 are set by the projections 213 according to a "letter" code combination which is entered in the storage device of the machine. Moreover, the bar 206 is rocked counterclockwise by the projection 212 and through the crank 209 moves the slide 120 to the rear. The slide 120 causes thus the automatic transmission of the answer back in the manner hereinbefore decribed. Simultaneously with the sending of the first code combination of the answer back, the slides 19 (FIG. 2) are set according to the "letter" combination. The latch 37 is now disengaged from the stud 36, whereby the "letter" combination is not transferred to the transmission bars 8 and is not sent to line.

Assuming now that the slide 204 is moved to the rear during the transmission of one or more code combinations previously entered in the storage device from the keyboard. The slide 204, on the one hand, enters the "letter" combination in the storage device as in the previous case and, on the other hand, by rocking the bar 206 counterclockwise displaces the slide 120 to the rear, where it is locked by the lever 138. Since, however, the bail 123 is now in the position shown by dash lines in FIG. 3, the lug 122 prevents the slide 111 from being moved to the left, thus temporarily preventing the transmission of the automatic reply. The slide 120, however, stretches the springs 121 and 131 and is retained in the position reached by the lug 137 of the lever 138.

At the end of the transmission of the code combinations, the storage device produces the positioning of the code slides 19 (FIG. 2) according to the "letter" combination, which is then transferred to the transmission bars 8 and is therefore sent to line. At the end of the transmission of the "letter" combination, the bail 123 (FIG. 3) is returned to its inoperative position. The slide 111 is now moved to the rear by the spring 121 and produces the transmission of the automatic answer back. After the slide 204 (FIG. 1) has been set leftwards the bar 206 remains in the rocked position, since it is rigidly connected to the slide 120. The slide 6 and the slide 205 therefore remain locked, so that the possible depression of any other key has no effect on the transmission.

Similarly, when the slide 205 is moved to the rear, the bars 4 are positioned by the projections 213 according to a "letter" code combination, which is entered in the storage device of the machine. Moreover, the bar 207 is rocked by the projection 219 counterclockwise and, by means of the lug 216 of the crank 205, rocks the lever 171 counterclockwise, thus producing a cycle of the shaft 160 (FIG. 7) of the tape reader and of the transmitting shaft 31, as hereinbefore described. Simultaneously with the transmission of the first code combination read in the tape, the slides 19 (FIG. 2) are positioned according to the "letter" code and read in the storage device, which is not transferred to the transmission bars 8 because the latch 37 is also disengaged from the stud 36.

On the contrary, assuming that the slides 205 (FIG. 1) is moved to the rear when the transmission of one or more previously set-up code combinations is in progress. The slide 205 then enters the "letter" combination in the storage device and, by means of the bar 207 and the crank 215, rocks the lever 171 counterclockwise as in the previous case. As the lug 199 of the bail 123 is now in the position shown by dash lines in FIG. 7, it prevents the slide 193 from being moved forward. The spring 172 is thus tensioned, while the lever 171 remains locked in the turned position by the latch 181.

At the end of the transmission of the set up combinations the transmission of the "letter" combination entered in the storage device is effected as in the previous case. The bail 123 then returns to the position shown in FIG. 3, so that the spring 172 (FIG. 7) causes the shaft 160 of the tape reader to start in the manner hereinbefore seen.

After the bar 207 (FIG. 1) has positioned the lever 171, it is immediately restored to the inoperative position by the spring 217. The slide 6 and the slide 204 can therefore be displaced by the keyboard. If, during the reading of the tape the operator depresses a printing key, the slides 19 (FIG. 2) are set up as hereinbefore stated, but the corresponding code combination is not set to line because the latch 37 is disengaged from the pin 36. On the contrary if the "HERE IS" key is depressed during the reading of the tape, the bar 206 is rocked and the slide 120 is locked in the shifted position by the lever 138, whereby the automatic answer back is transmitted automatically at the end of the reading of the tape as the conclusion of the message read therein.

At the end of the reading of the message punched in the tape, the lever 220 is rocked counterclockwise in a manner known per se and engages the latch 181, which is rocked counterclockwise and stops the shaft 160 (FIG. 7) of the reader in the manner seen before. The bail 106 now returns to its inoperative position together with the latch 37 and the bail 99. The spring 172 can now move the slide 193 forward, thus causing the drum 60 to be read to transmit the automatic answer back.

It will be understood that various modifications, improvements and additions of parts may be made in the described transmission device without departing from the scope of the invention as claimed in the appended claims.

What is claimed is:

1. A transmission device for a start-stop teleprinter having a set of code members, a set of transmission bars associated with said code members and adapted to represent code combinations to be transmitted, a cyclically operable parallel-to-series converter adapted to be controlled by said transmission bars to transmit each one of said code combinations, and a set of sensing members adapted to simultaneously sense a mechanical memory storing a predetermined message, wherein the improvement comprises:
   (a) a set of substantially cross-shaped transfer levers associated with said code members and adapted to assume one of a pair of positions for transferring the code combination of a message to be transmitted to said transmission bars,
   (b) a pair of opposite arms on each one of said levers,
   (c) a pair of shoulders provided on each one of said code members and adapted to selectively engage the opposite arms of the associated levers so as to positively displace same to each one of said pair of positions,
   (d) a third arm on each one of said levers to connect each one of said levers to a corresponding one of said transmission bars,
   (e) a pair of elements on each one of said levers,
   (f) and a pair of counterelements on a corresponding one of said sensing members for selectively engaging the elements of the corresponding lever to displace same to each one of said pair of positions.

2. A device according to claim 1, comprising in combination:
   (g) a pair of actuators, a first one of said actuators being normally effective for causing said code members to set the corresponding transfer levers, a second one of said actuators being normally ineffective and being adapted to be rendered effective for causing said sensing members to sense said memory,
   (h) and control means for rendering said first actuator ineffective and said second actuator effective and for causing a transmission cycle of the converter when said sensing members sense said memory.

3. A device according to claim 1, comprising in combination:
   (g) a pair of actuators individually conditionable for operation, a first one of said actuators when operated being adapted to cause said code member to so displace said levers, the second actuator when operated being adapted to cause said sensing members to so displace said levers,
   (h) a first latch normally engaging said first actautor for conditioning it for operation,
   (i) a second latch normally disengaged from said second actuator and engageable theerwith for conditioning it for operation,
   (j) a common pivot rockably mounting said latches, said latches being mutually connected so as to be bodily rotated.
   (k) and a control member actuatable for rocking said latches to disengage said first latch from said first actuator and to engage said second latch with said second actuator, said sensing members being conditioned for sensing said memory by said second actuator when operated.

4. A device according to claim 3, comprising in combination:
   (l) an intermediate member shiftable to an effective position for resiliently actuating said control member,
   (m) a "HERE IS" key depressible for shifting said intermediate member,
   (n) an element movable on reception of a "WHO ARE YOU" code combination for shifting said intermediate member to said effective position irrespectively from said key,
   (o) and a transmission indicating member adapted to assume a first position when the teleprinter is transmitting code combinations set up on said code members and a second position when the teleprinter is not transmitting, said set up code combinations for preventing said control member from being actuated as long as said transmission indicating member is in said first position.

5. A device according to claim 4, wherein said memory is constituted by a strip drum rotatable step by step, comprising in combination:
   (p) a latching member adapted to latch said intermediate member when shifted to said effective position,
   (q) and a cam secured to said drum and adapted to cause said latching member to release said intermediate member when said drum has been rotated one revolution.

6. A device according to claim 4, comprising in combination:

(p) an intermediate lever adapted to shift said intermediate member to said effective position, (q) a stem carrying said "HERE IS" key and resiliently connected to said intermediate lever, (r) and a hook connected to said intermediate member and cooperating with said stem to prevent said intermediate member from being shifted until said "HERE IS" key is fully depressed.

7. A device according to claim 3, comprising in combination:

(l) an intermediate member shiftable to an effective position for resiliently actuating said control member, (m) a set of selectively settable code bars, (n) another bar adjacent to said code bars and rigidly connected to said intermediate member, (o) and a manual setting member adapted to set said code bars according to a specific code combination and said other bar so as to shift said intermediate member to said effective position, said other bar being adapted to prevent said code bars from being set up according to any other code combination as long as said intermediate member is so shifted.

8. A transmission device for a start-stop teleprinter having a set of code members, a set of transmission bars associated with said code members and adapted to represent code combinations to be transmitted, a cyclically operable parallel-to-series converter adapted to be controlled by said transmission bars to transmit each one of said code combinations, a set of sensing members adapted to simultaneously sense an answer back memory, and a set of tape reader code elements, wherein the improvement comprises:

(a) a set of substantially cross-shaped transfer levers associated with said code members and adapted to assume one of a pair of positions for transferring the code combination of a message to be transmitted to said transmission bars, (b) a pair of opposite arms on each one of said levers, (c) a pair of shoulders provided on each one of said code members and adapted to selectively engage the opposite arms of the associated levers so as to positively displace same to each one of said pair of positions, (d) a third arm on each one of said levers to connect each one of said levers to a corresponding one of said transmission bars, (e) a pair of abutments on each one of said levers, (f) a pair of shoulders on a corresponding one of said sensing members for selectively engaging the abutments of the corresponding lever to displace same to each one of said pair of positions, (g) and a set of connecting members for rigidly connecting said code elements with said transmission bars.

9. A device according to claim 8, comprising in combination:

(h) a main shaft for cyclically controlling said code elements, (i) a cyclically operable transmission shaft for operating said converter, (j) a one cycle clutch having a driving member and driven member, the driven member being engageable with the driven member only in a predetermined mutual angular relationship, (k) and manually actuatable means for engaging said clutch and simultaneously causing said transmission shaft to effect one transmission cycle, whereby said clutch is engaged while said driving member is standing.

10. A device according to claim 9, comprising in combination:

(l) a depressible reading starting key, (m) a shiftable member adapted to be shifted at the depression of said key for resiliently actuating said actuatable means, (n) means for locking said shiftable member in the shifted position, (o) a transmission indicating member adapted to assume a first position when the teleprinter is transmitting code combinations set up on said code members and a second position when the teleprinter is not transmitting said set up combinations, (p) an actuation preventing element for preventing said actuatable means from being actuated as long as said transmission indicating member is in said first position, (q) a depressible reading stop key, (r) a member responsive to the absence of a tape in the reader, (s) and means operable either by said reading stop key and by said responsive member for releasing said shiftable member.

11. A transmission device for a start-stop teleprinter having a set of code members, a set of transmission bars associated with said code member and adapted to represent code combinations to be transmitted, a cyclically operable parallel-to-series converter adapted to be controlled by said transmission bars to transmit each one of said code combinations, a set of sensing members adapted to simultaneously sense an answer back memory, and a set of tape reader code elements, wherein the improvement comprises:

(a) a set of substantially cross-shaped transfer levers associated with said code members and adapted to to assume one of a pair of positions for transferring the code combination of a message to be transmitted to said transmission bars, (b) a pair of opposite arms on each one of said levers, (c) a pair of shoulders provided on each one of said code members and adapted to selectively engage the opposite arms of the associated levers so as to positively displace same to each one of said pair of positions, (d) a third arm on each one of said levers to connect each one of said levers to a corresponding one of said transmission bars, (e) a pair of abutments on each one of said levers, (f) a pair of shoulders on a corresponding one of said sensing members for selectively engaging the abutments of the corresponding lever to displace same to each one of said pair of positions, (g) a set of connecting members for rigidly connecting said code elements with said transmission bars, (h) a pair of actuators individually conditionable for operation, a first one of said actuators when operated being adapted to cause said code member to so displace said levers, the second actuator when operated being adapted to cause said sensing members to so displace said levers, (i) a first latch normally engaging said first actuator for conditioning it for operation, (j) a second latch normally disengaged from said second actuator and engageable therewith for conditioning it for operation, (k) a common pivot rockably mounting said latches, said latches being mutually connected so as to be bodily rotated, said second latch being also slidable axially on said pivot, (l) a control member actuatable for rocking said latches to disengage said first latch from said first actuator and to engage said second latch to said second actuator, said sensing members being conditioned for sensing said memory by said second actuator when operated, (m) manually actuatable means for causing operation of said code elements, (n) and a member comprised in said actuatable means for actuating said control member and for axially displacing said second latch in such a manner that upon being rocked by said control member it does not engage said second actuator.

12. A device according to claim 11, comprising in combination:
(o) a shiftable member adapted to be shifted to actuate said actuatable means,
(p) a set of selectively settable code bars,
(q) a further bar adjacent to said code bars and settable to shift said shiftable member,
(r) and a manually operable reading control member for setting said code bars according to a specific code combination and said further bar so as to shift said shiftable member.

No references cited.

KATHLEEN H. CLAFFY, Primary Examiner

T. J. D'AMICO, Assistant Examiner

U.S. Cl. X.R.
178—17.5